(12) United States Patent
Yang

(10) Patent No.: US 6,808,630 B2
(45) Date of Patent: Oct. 26, 2004

(54) SYSTEM AND METHOD FOR AI CONTROLLING WASTE-WATER TREATMENT BY NEURAL NETWORK AND BACK-PROPAGATION ALGORITHM

(75) Inventor: Ik-Bae Yang, Kyungki-Do (KR)

(73) Assignee: H2L Co., Ltd., Aanyang (KR)

( * ) Notice: Subject to any disclaimer, the term of this patent is extended or adjusted under 35 U.S.C. 154(b) by 75 days.

(21) Appl. No.: 10/347,466

(22) Filed: Jan. 21, 2003

(65) Prior Publication Data

US 2003/0234218 A1 Dec. 25, 2003

(30) Foreign Application Priority Data

Jun. 21, 2002 (KR) ................................ 10-2002-0034788

(51) Int. Cl.$^7$ ................................................. C02F 3/00
(52) U.S. Cl. .......................... 210/614; 210/143; 706/23
(58) Field of Search ................................ 210/612–614, 210/739–746, 143; 706/23

(56) References Cited

U.S. PATENT DOCUMENTS

| | | | | |
|---|---|---|---|---|
| 5,448,476 A | * | 9/1995 | Kurokawa et al. | ............. 702/2 |
| 5,733,456 A | * | 3/1998 | Okey et al. | ................. 210/605 |
| 5,832,468 A | * | 11/1998 | Miller et al. | ................... 706/23 |
| 2003/0236649 A1 | * | 12/2003 | Kodukula et al. | .......... 702/188 |

OTHER PUBLICATIONS

Masters, *Advanced Algorithms for Neural Networks, A C++ Sourcebook*, John Wiley and Sons, Inc., 1995.
Simpson, *Artificial Neural Systems*, Pergamon Press, 1990.
Rumelhart et al., "Learning Representations by Back–propagating Errors," *Nature* (Oct. 9, 1986), vol. 323, pp. 533–536.
Wasserman, *Neural Computing Theory and Practice*, Van Nostrand Inc., 1990.
"Neural Network Toolbox for Use with MATLAB", The Math Works Inc.
Press et al., "Numerical Recipes", pp. 523–528, 1986, Cambridge University Press.

Kim et al., "Implementation of MLP based on L–M Algorithm to Odour Patterns Classification and Concentration using Odou Sensing System", ISOEN 2000.
Finschl, "An Implementation of the Levenberg–Marquardt Algorithm", clausiusstrasses 45, CH–8092, Zuerich.
Press et al., *Numerical Recipes: The Art of Scientific Computing*, pp. 523–528, 1986, Cambridge University Press.
Kim et al., "Application of a Multilayer Perceptron Based on the Levenberg–Marquardt Algorithm to Odour Pattern Classification and Concentration Estimation using Odour Sensing System", *Seventh International Symposium on Olfaction and Electronic Noses* (Jul. 2000), pp. 115–120.
Demuth et al., "Neural Network Toolbox for Use with MATLAB®—User's Guide", Copyright 1992–2001 by the MathWorks, Inc.

* cited by examiner

*Primary Examiner*—Chester T. Barry
(74) *Attorney, Agent, or Firm*—Foley & Lardner LLP

(57) ABSTRACT

A system and method for controlling treatment of the sewage/waste water. The method includes measuring attributes of inflow water flowing into a sewage/waste water treatment plant, attributes of an internal condition of a reaction tank having a first story and a second story, and fluid present values (PVs) of efficiency attributes of outflow water. The method also includes collecting data of the measured fluid PVs and operation-processing the data to convert the data into physical quantity data. The method also includes obtaining each optimum set point (SP) of each dissolved oxygen (DO) and solids retention time (SRT) of the first story and the second story of an exhalation tank by comparing PVs of the measured attributes using a neural network control program with a back-propagation algorithm. The method also includes converting each obtained optimum SP into an analog and digital control output value by comparing each obtained optimum SP with each PV of each DO and SRT of the first story and the second story of the exhalation tank. The method also includes controlling each air control valve of the first story and the second story of the exhalation tank and a pump for drawing sludge based on each obtained control output value.

20 Claims, 15 Drawing Sheets

FIG. 7

```
include <analysis.h> define ii_n (Nout+Nhid*Nout+Nhid*Nin+Nhid)

double input[Nin] [SAMPLE];
double target[Nout] [SAMPLE];
                                    ....
double a1 [Nhid] [SAMPLE], a2[Nout] [SAMPLE];
double err [Nout] [SAMPLE], new_err[Nout] [SAMPLE];
double ext_p[Nin] [Nout*SAMPLE];
double JJ [ii_n] [ii_n], ii[ii_n] [ii_n], JE[ii_n], dx[ii_n];
double temp [Nhid] [SAMPLE*Nout];
double tempj1_1[SAMPLE*Nout] [Nhid*Nin];
double tempj2_1[SAMPLE*Nout] [Nhid*Nout];
double j1[SAMPLE*Nout] [Nhid*Nin], j2[SAMPLE*Nout] [Nhid*Nout];
                                    ....
void jacobian()
{
   int i,j,k, sum;
   double fsum;
                                    ....
//   ext_a1=nncpyi(a1, s2);
//        where,   a1 = Nhid x SAMPLE  s2 = Nout    ext_a1 : Nhid x (Nout x SAMPLE)
   for(i=0; i<Nhid; i++)
            for(j=0; j<SAMPLE; j++)
                            for(k=0; k<Nout; k++)
                                            ext_a1[i] [k+j*Nout]=a1[i] [j];
                                    ....
// return err2sum;
}
                                    ....
   for(i=0; i<s1; i++)
            for(j=0; j<r; j++)
               w[i] [j]=2.*w[i] [j] / rng[j];
                                    ....
for(j=0; j<SAMPLE; J++)
            for(i=0; i<Nin; i++) {
```

FIG. 8

| TEMPERATURE | BOD | NH4-N | VOLUME LOAD | DO1 | DO2 | SRT |
|---|---|---|---|---|---|---|
| 5 | 1 ~ 180 | 0 ~ 150 | 0 ~ ∞ | 4.03 | 3.03 | 18.1 |
| 6 | | | | 3.95 | 2.95 | 17.9 |
| 7 | | | | 3.90 | 2.90 | 17.5 |
| 8 | | | | 3.85 | 2.85 | 17.2 |
| 9 | | | | 3.80 | 2.80 | 16.8 |
| 10 | | | | 3.75 | 2.75 | 16.5 |
| 11 | | | | 3.70 | 2.70 | 16.1 |
| 12 | | | | 3.65 | 2.65 | 15.8 |
| 13 | | | | 3.60 | 2.60 | 15.4 |
| 14 | | | | 3.55 | 2.55 | 15.1 |
| 15 | | | | 3.50 | 2.50 | 14.7 |
| 16 | | | | 3.45 | 2.45 | 14.4 |
| 17 | | | | 3.40 | 2.40 | 14.0 |
| 18 | | | | 3.35 | 2.35 | 13.7 |
| 19 | | | | 3.30 | 2.30 | 13.3 |
| 20 | | | | 3.25 | 2.25 | 13.0 |
| 21 | | | | 3.20 | 2.20 | 12.6 |
| 22 | | | | 3.15 | 2.15 | 12.3 |
| 23 | | | | 3.10 | 2.10 | 11.9 |
| 24 | | | | 3.05 | 2.05 | 11.6 |
| 25 | | | | 3.00 | 2.00 | 11.2 |
| 26 | | | | 2.95 | 1.95 | 10.9 |
| 27 | | | | 2.90 | 1.90 | 10.5 |
| 28 | | | | 2.85 | 1.85 | 10.2 |
| 29 | | | | 2.80 | 1.80 | 9.8 |
| 30 | | | | 2.75 | 1.75 | 9.5 |
| 31 | | | | 2.70 | 1.70 | 9.1 |
| 32 | | | | 2.65 | 1.65 | 8.8 |
| ... | | | | ... | ... | ... |
| 38 | | | | 2.60 | 1.60 | 8.4 |

\* THE ABOVE DATA ARE MEAN VALUES OF HEURISTIC DATA.

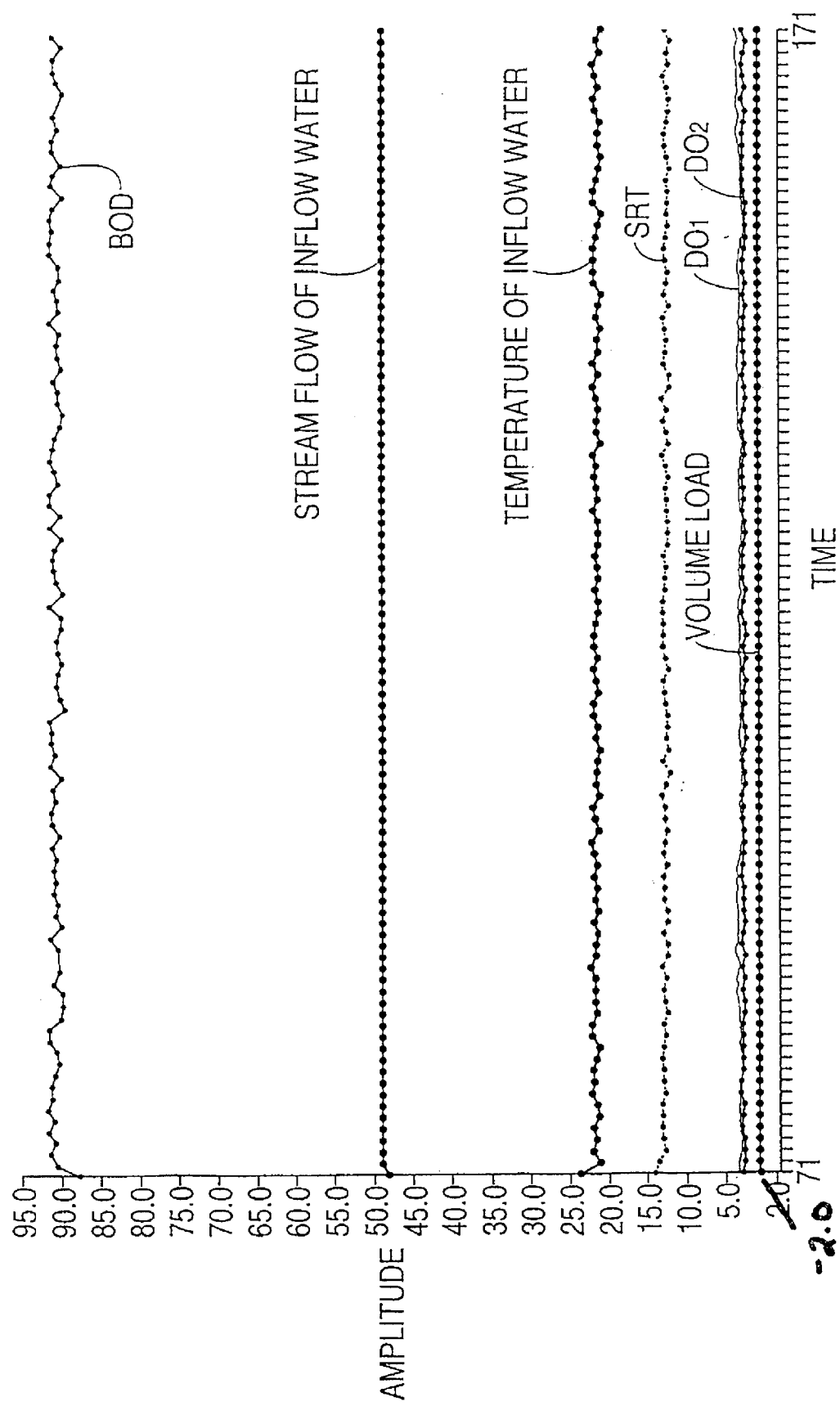

SYSTEM AND METHOD FOR AI CONTROLLING WASTE-WATER TREATMENT BY NEURAL NETWORK AND BACK-PROPAGATION ALGORITHM

RELATED APPLICATIONS

This application claims priority to Korean Application No. 2002-0034788, filed on Jun. 21, 2002, which is incorporated in its entirety herein by reference.

FIELD OF THE INVENTION

This invention relates generally to the field of treating sewage/waste water using AI (artificial intelligence) for automatically controlling variable factors, and more particularly, a system and method using an AI control system for automatically controlling variable factors such as DO (dissolved oxygen), SRT (solids retention time) and others depending upon properties of inflow water, the internal condition of the reaction tank and a target treated water quality.

BACKGROUND OF THE INVENTION

In conventional sewage/waste water treatment plants, each SP (set point) is personalized according to the experience of the operator considering a number of factors. Significant factors of the operator's experience include seasonal differences in the temperature, BOD (biological oxygen demand) and stream flow of incoming fluids. The PID (proportional integral differential) and ON/OFF control system is implemented according to these factors. The operator changes each SP of DO and SRT for controlling the plant every several days based on daily data.

For example, in an automatic control system using the most commercialized PLC (programmable logic controller), data obtained from each measuring instrument is transmitted to the PLC. The data includes the BOD, incoming stream flow and water temperature, each DO of the first story and the second story of the exhalation tank, MLSS (mixed liquor suspended solids) of the aeration tank, a concentration of sludge, a drawn stream flow, and BOD of the outflow water for controlling each SP.

The data obtained from the input/output cards of the PLC (analog/digital (A/D) card, digital/analog (D/A) card, respectively) are operation-processed and PID and ON/OFF controlled through a central processing unit (CPU) with a small capacity and execution speed built into the PLC. Further, data inputted into and outputted from the PLC is transmitted to the computer through an interface via RS-232C communication signals.

The computer simply executes only the function to convert data inputted into and outputted from the PLC into data of a physical quantity (physical quantity data), which can be identified visually, displayed, saved and controlled.

The automatic control system implementing this method is simple, but it has difficulty in controlling DO and SRT using consecutive SPs depending on fluid properties of the inflow water. It is difficult to control each SP by applying changes that occur over time relying primarily on the operator's intuition. Moreover, with this system, it is impossible to control each SP consecutively as a method to enhance the efficiency of treating sewage/waste water. In addition, in the absence of the operator, it is difficult to maintain the existing treatment efficiency or enhance the treatment efficiency.

SUMMARY OF THE INVENTION

One object of the invention is to overcome the disadvantages of the known systems and methods described above.

According to an embodiment of the invention there is provided a method for controlling treatment of sewage/waste water. The method comprises: measuring attributes of inflow water flowing into a sewage/waste water treatment plant, attributes of an internal condition of a reaction tank having a first story and a second story, and fluid present values (PVs) of efficiency attributes of outflow water; collecting data of the measured fluid PVs and operation-processing said data to convert said data into physical quantity data; obtaining each optimum set point (SP) of each dissolved oxygen (DO) and solids retention time (SRT) of the first story and the second story of an exhalation tank by comparing PVs of the measured attributes using a neural network control program with a back-propagation algorithm; converting each obtained optimum SP into an analog and digital control output value by comparing said each obtained optimum SP with each PV of each DO and SRT of the first story and the second story of the exhalation tank; and controlling each air control valve of the first story and the second story of the exhalation tank and a pump for drawing sludge based on each obtained control output value.

According to another embodiment of the invention there is provided a system for controlling treatment of sewage/waste water. The system comprises: measuring instruments for respectively measuring attributes of inflow water flowing into a sewage/waste water treatment plant, attributes of an internal condition of a reaction tank having a first story and a second story, and fluid present values (PVs) of efficiency attributes of outflow water; a computer for: collecting data of the measured fluid PVs, and operation-processing the data to convert the data into physical quantity data; obtaining each optimum set point (SP) of each dissolved oxygen (DO) and solids retention time (SRT) of the first story and the second story of an exhalation tank by comparing PVs of the measured attributes by means of an application program including a neural network control program using a back-propagation algorithm; and converting each obtained optimum SP into an analog and digital control output value by comparing each obtained optimum SP with each PV of each DO and SRT of the first story and the second story of the exhalation tank; and air valve controllers for controlling each air control valve of the first story and the second story of the exhalation tank and a pump for drawing sludge by using a control output value.

Further objects, features and advantages of the present invention will become apparent from the detailed description of preferred embodiments that follows, when considered together with the accompanying figures of drawing.

BRIEF DESCRIPTION OF THE DRAWINGS

FIG. 7 is an example of the AI learning program used in an embodiment of the present invention.

FIG. 8 is an example of heuristic data applied to the present invention.

FIG. 16 is a graph of overall output signals inputted to and outputted from the system of an embodiment of the present invention.

DETAILED DESCRIPTION OF THE PREFERRED EMBODIMENTS

Embodiments of the present invention relate to an AI control system wherein a retention time is applied to each volume of the reaction tank and the sedimentation tank sewage/waste of a treating water system. The retention time is a fixed factor applied to the initial design, wherein each SP (set point), such as each DO and SRT of the first story and the second story of the exhalation tank of the treatment system is obtained from the data collected by automatically measuring BOD (biological oxygen demand). The data also includes incoming stream flow and water temperature, which are fluid design factors, of water flowing into the waste water treatment plant through a combined sewer. An appropriate knowledge-base is built up by collecting the existing parameters (i.e., BOD, temperature and stream flow as inflow attributes, DO and MLSS (mixed liquor suspended solids) as attributes of the reaction tank, SRT as a design factor, and a concentration of T-N (total nitrogen) and BOD as attributes of the treated water) in a manner to automatically control a control valve (C/V) for controlling the air supply and a pump for drawing sludge through each PV (present value). A learning method and an algorithm for controlling the surplus sludge and the like are then used by letting AI (corresponding to a neural network controller) learn through the use of the knowledge-base. The concentration of DO is set in response to any change in the temperature and concentration and an appropriate SRT is calculated. This AI control learning method is applicable to most sewage treatment plants by means of re-learning and tuning the AI in which some modifications and new data are used, regardless of any difference in the construction method of the treatment plant and any change in the capacity and flow in the sewage treatment plant. Tuning using new accumulated data possible resulting in a new and more efficient AI.

Reference will now be made in detail to presently preferred embodiments of the present invention. Wherever possible, the same reference numbers will be used throughout the drawings to refer to the same or like parts.

Figure 1:
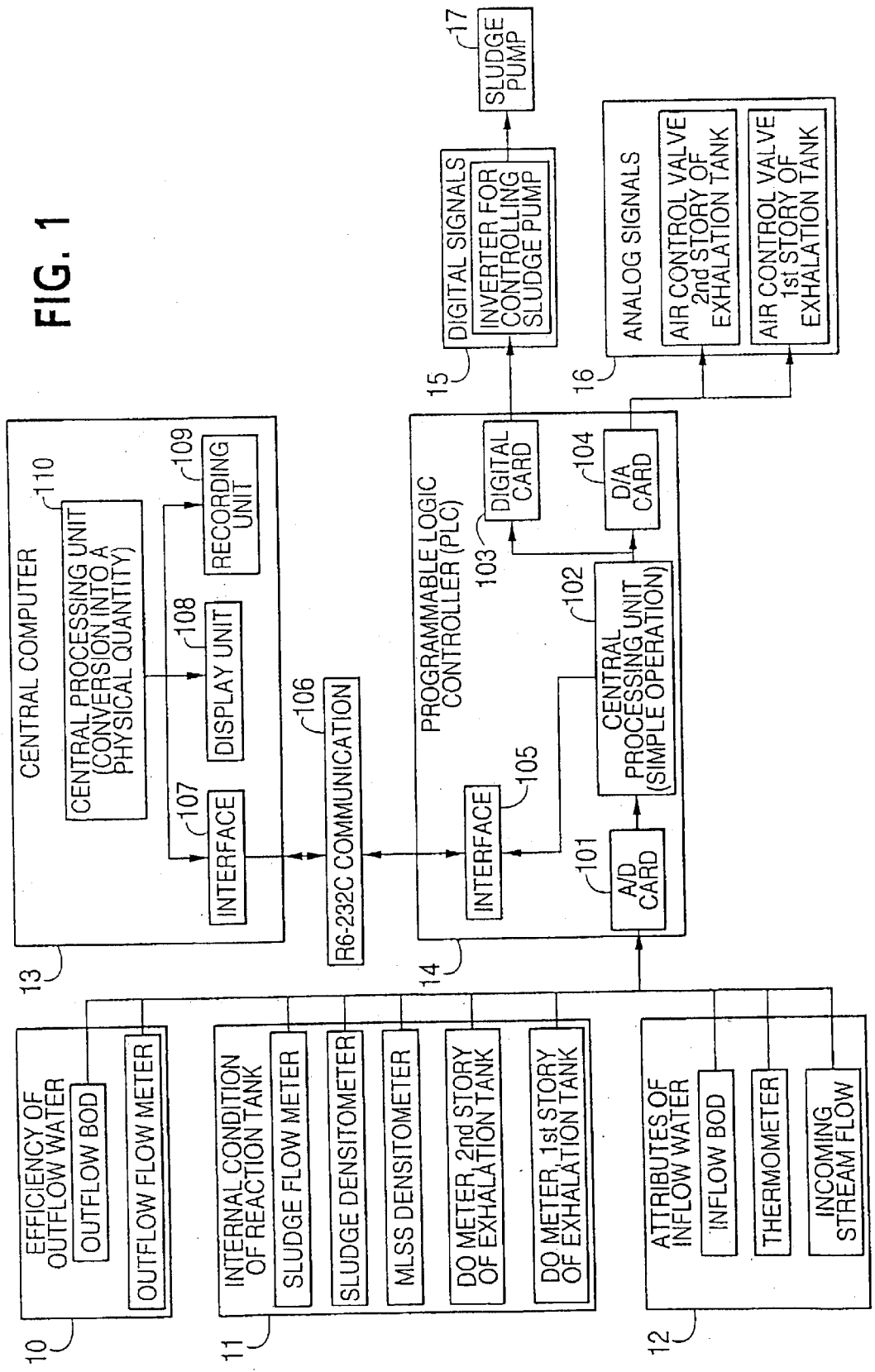
FIG. 1 is a block diagram illustrating one embodiment of an AI control system using a programmable logic controller according to the present invention.

FIG. 1 shows one embodiment of an AI control system according to the present invention. As shown in this embodiment, data obtained from each measuring instrument 10, 11, 12, is transmitted in analog signals to A/D card 101 of PLC 14. The data transmitted to the A/D card 101 includes data regarding efficiency of outflow water 10, internal condition of reaction tank 11, and attributes of inflow water 12. This data includes BOD, incoming stream flow and water temperature as attributes of the inflow water, each DO of the first story and the second story of the exhalation tank, MLSS of the aeration tank, concentration of sludge, drawn stream flow and BOD of the outflow water.

Figure 2:
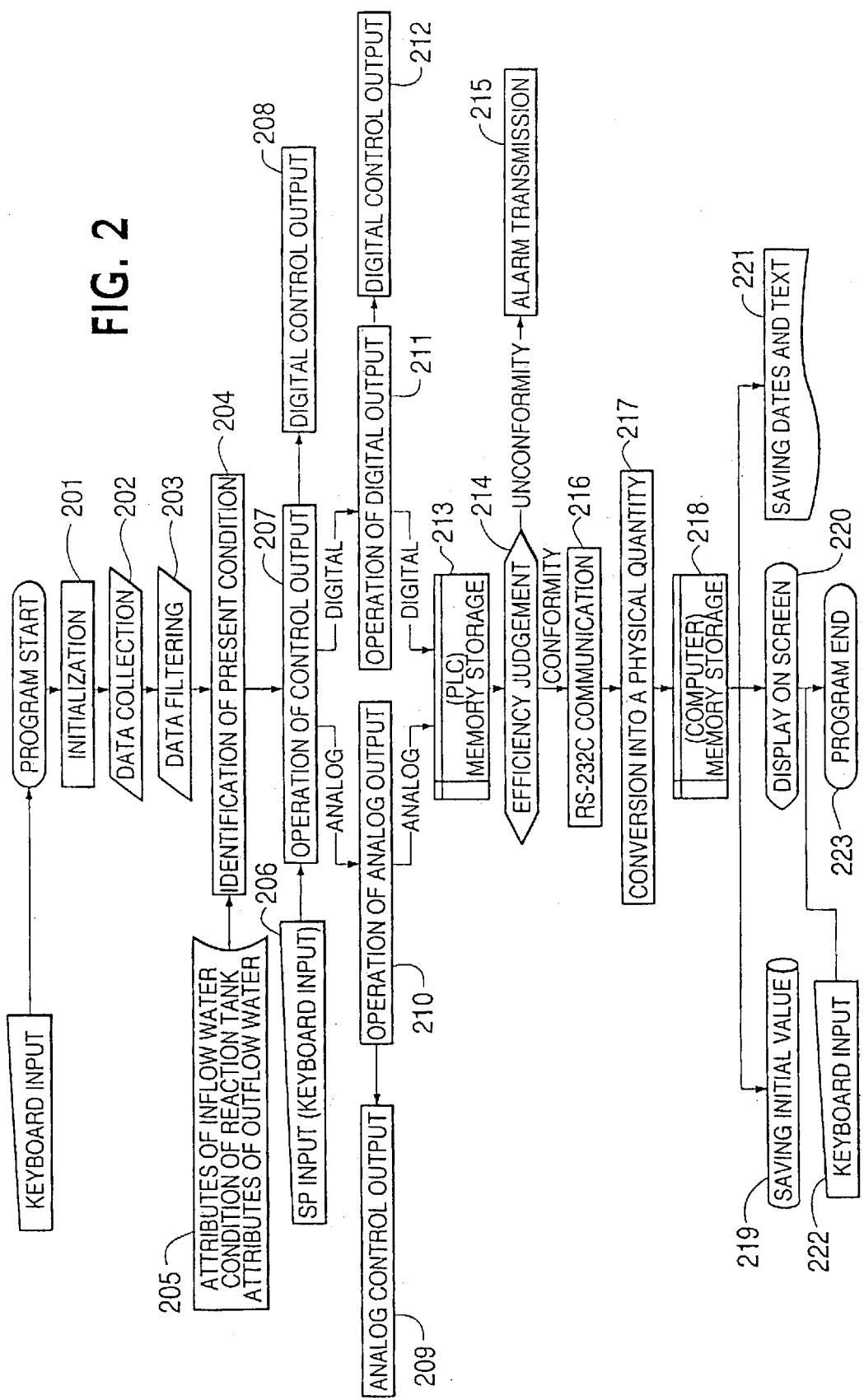
FIG. 2 is a flow chart illustrating an exemplary method of an AI control system using the programmable logic controller according to the present invention.

Such data may be used in the system according to the flow chart as shown in FIG. 2. The program starts and is initialized at step 201. The existing data is collected, (step 202) and filtered (step 203). Attributes of the inflow water, the internal condition of the reaction tank and the outflow water as measured are inputted to the PLC at step 205. The current condition is identified (step 204). Each identified PV and each SP input value 206 is operation-processed (steps 207, 210, 211) for controlled output (steps 209, 212) in analog and digital signals, respectively, and at the same time saved (step 218) in the memory of PLC 14. In case the data is judged to be in conformity with the criteria for efficiency (step 214), the data is operation-processed to convert it into data of a physical quantity through a moving average process (step 217). The data is saved by date (step 221) and each initial value is saved (step 219). Further, in one embodiment, the data may be bi-directionally communicated by means of TCP/IP (transmission control protocol/internet protocol) through an RS232C communication unit 106 as shown in FIG. 1, so that the data is displayed on the monitor screen of the computer set (step 220). Communication of the date does not necessarily require a TCP/IP connection. Any compatible connection can function with the present invention.

Figure 3:
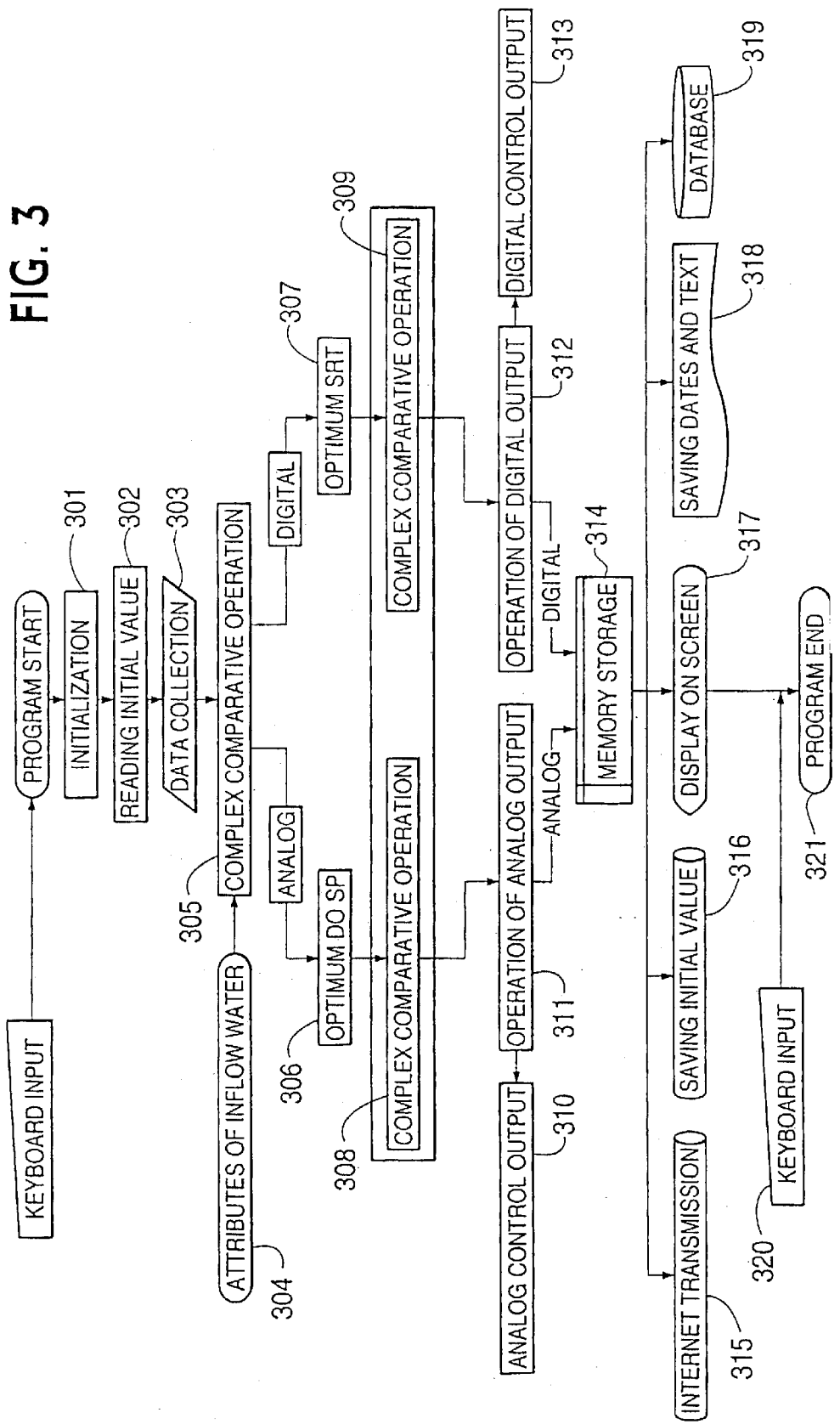
FIG. 3 is a flow chart illustrating an exemplary method of the program used in an embodiment of the present invention.

FIG. 3 is a flow chart illustrating method steps of the program used in this embodiment of the invention. The program starts and is initialized (step 301). The data is collected at step 303. The data of a physical quantity is converted depending upon attributes of the inflow water inputted at step 304. At step 305, the data is complexly and comparatively operation-processed. Through this complex and comparative operation process, each SP (steps 306, 307) of each DO and SRT of the first story and the second story of the exhalation tank is obtained, which enables denitrification and dephosphorization of the inflow water to be made at a given concentration or more regardless of attributes of the inflow water, including temperature, stream flow, etc. A highly efficient stabilized water treatment system can be built up by equipping the water treatment process with the AI system and the automation system. The consistency and the safety of each measuring instrument and the stability of the automatic control system required for automation to be secured is done by building up the database and controlling the AI (corresponding to the neural network). The treatment efficiency can be enhanced regardless of seasonal temperature or concentration of the inflow water.

Each obtained optimum SP of each DO and SRT of the first story and the second story of the exhalation tank is complexly and comparatively operation-processed (steps 308 and 309), and is operation-processed for analog output (step 311), and digital output (step 312), respectively, to do each analog control output 310 and digital control output 313. At step 314, each control output is saved in memory, and is used for transmission over the Internet (step 315). Each initial value is saved (step 316) and displayed on the monitor screen (step 317). Text is saved by date (step 318) and is registered in the database (step 319).

Figure 4:
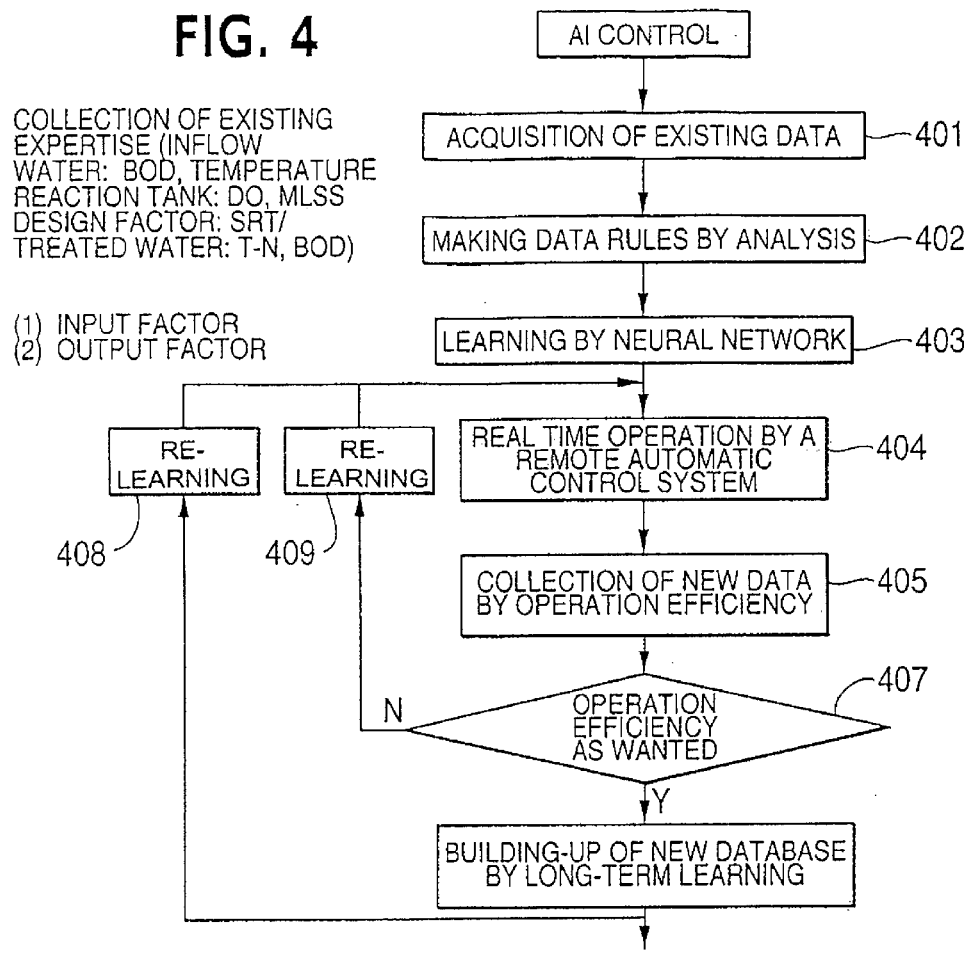
FIG. 4 is a flow chart illustrating exemplary method steps of the learning function of the neural network used in an embodiment of the present invention.

The overall learning and application process as used herein is illustrated in FIG. 4.

The AI control process collects and acquires expertise data (step 401), such as BOD of the inflow water, DO and MLSS of the reaction tank and concentration of T-N and BOD of the treated water, and further makes data rules by analyzing such data (step 402).

Such data rules are made by the neural network (step 403). The neural network uses a back-propagation algorithm and a learning optimization algorithm in which the Levenberg-Marquardt method, the Newton method and the steepest descent method are available, as shown in Mathematical Formula 1. In step 404, a real time operation is performed using a remote automatic control system. In step 405, new data is collected by operation efficiency. Further, the neural network calculates the operation efficiency after the actual operation of the plant. In step 407, short term tuning is performed until the desired efficiency is reached on the basis of newly acquired high efficiency data. The new database is built up by long term learning. Through this re-learning process, a new database is built up in step 406.

$$\omega_{i+1} = \omega_i - (H + \lambda I)^{-1} \nabla F(\omega_i) \quad \text{Mathematical Formula 1:}$$

I is the "Identity Matrix." λ=0 corresponds to the Newton Method, while λ•• correspond to the Steepest Descent Method. A is dynamically adjusted.

In the back-propagation algorithm, properties of the inflow water (a stream flow, temperature, BOD), internal conditions of the reaction tank (volume load, SRT, DO, MLSS, concentration of ammonia nitrogen (NH4-N), concentration of nitrate nitrogen (NO3-N), concentration of phosphorate-phosphorus (PO4-P)), and the treated water quality (BOD, T-N) may be used as data input for learning. The target data corresponding to this input data on a one-to-one basis are each DO and SRT of the first story and the second story of the exhalation tank.

FIG. 8 illustrates exemplary data for the input learning. As illustrated in FIG. 8, data for the input learning can be inputted in the following range: temperature ranges between about 5° C. and about 38° C., BOD ranges from about 0 to about 180 mg/l, NH4-N ranges between about 0 and about 150 mg/l, and volume load ranges from zero to infinity. The output data corresponding thereto is outputted in the following range: DO of the first story of the exhalation tank ranges from about 2.35 to about 4.3 mg/l, DO of the second story of the exhalation tank ranges from about 1.4 to about 3.3 mg/l, and SRT ranges from about 7.55 to about 21.0 days.

The learning data represents different controls. When the concentration of the inflow NH4 is increased, the control system increases MLSS to decrease the food to microbes ratio (F/M). When the concentration of the inflow NH4 is decreased, the control system decreases MLSS to increase F/M. In addition, when the concentration of the inflow water (BOD) and MLSS increases, the control system decreases MLSS to maintain F/M. However, when MLSS decreases, the control system decreases a drawing amount of surplus sludge, maintaining F/M. Furthermore, when the concentration of the inflow water (BOD) is increased, the control system increases the air supply. However, when the concentration of the inflow water (BOD) is decreased, the control system decreases the air supply while increasing the drawing amount of surplus sludge to decrease MLSS simultaneously.

Figure 5:
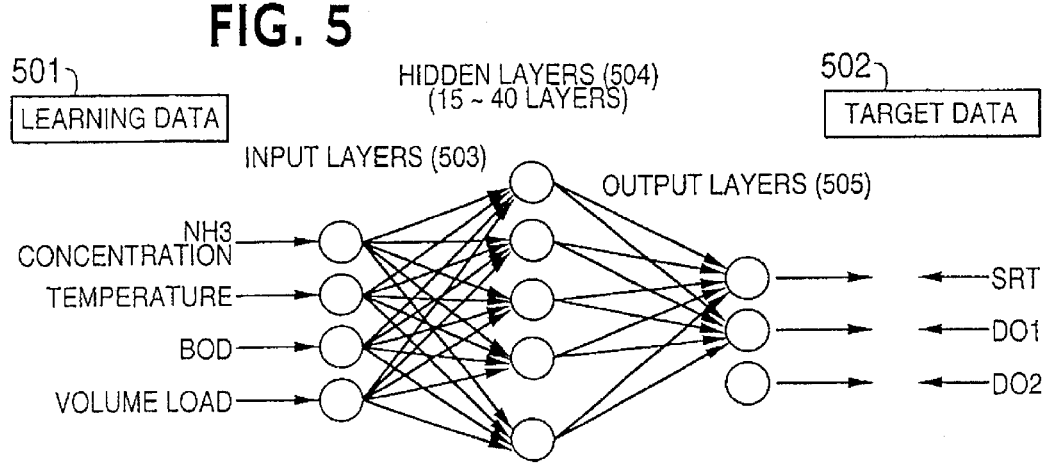
FIG. 5 illustrates the back-propagation algorithm used in an embodiment of the present invention.

FIG. 5 illustrates a system of the back-propagation algorithm used in this invention.

In this invention, a MLP (Multi-Layer Perception) model of back-propagation is used. Layers of the MLP model comprise input layer 503 receiving input from the environment, output layer 505 transmitting any output to the environment and a hidden layer or layers 504 between the input layer 503 and the output layer 505. The hidden layer 504 does not interact directly with the environment. The learning starts from the input layer and progresses to the output layer through the hidden layer. In a case where the neuron sums the values of the received inputs and the sum is relatively high, the neuron passes the inputs to the next node in the hidden layer 504.

When the inputs are passed, a weight is allocated, enhanced, or attenuated. This process continues until the model reaches the final outer layer (output layer) to forecast any result. The activator action adds relative importance to a pattern of high value and ignores a pattern of low value.

In this embodiment of the invention, only the linear sum is used as an active function since various SPs have to be forecasted in the output layer 505 and outputted from it.

Meanwhile, a non-linear active function is used in the hidden layer 504, and the AI control (neural network) accumulates the information acquired in the learning process in weight. This weight is used to acquire each optimum value of SRT and DO. The number of hidden layers 504 in this invention, as shown in FIG. 5, may be determined according to the particular application. In this embodiment, the number of hidden layers 504 is in the range of 15 to 40. The data input from the input layer 503 to the hidden layer 504, the data output from the hidden layer 504 to the output layer 505, and the weight are determined by Mathematical Formulas 2 to 4.

$$\nabla F(\omega_i) = \partial F / \partial \omega_i \quad \text{Mathematical Formula 2:}$$

Mathematical Formula 2 calculates F summing the entire error by a rate of change against the weight. Gradient "i" is the "i"th weight.

$$F = \Sigma_{(k=0, N)} e_k^2 : \text{SSE (square-sum error)} \quad \text{Mathematical Formula 3:}$$

Error "e" is the difference between SP and the output from the neural network, "k" is the "k"th sample, and F is the sum of $e_k^2$ from the k=0 sample to the k=N sample.

$$H = \nabla^2 F(\omega) \quad \text{Mathematical Formula 4:}$$

H is the Hessian matrix which is the second order derivative is obtained against the weight of F.

Each optimum SP obtained in the foregoing step is compared with the PV of DO of the first story of the exhalation tank and the PV of DO of the second story of the exhalation tank. The optimum SP is operation-processed for the analog control output (hereinafter referred to as MV) to obtain a control factor. In addition, the PV of the stream flow of drawn sludge is compared with the mass stream flow, and thereby, the digital MV is operation-processed to obtain a digital control factor. FIG. 7 illustrates an example of the software code embodied in the program language to obtain such control factors.

In this embodiment a set of data obtained in the foregoing step may be saved in one file and the data from the file may then be retrieved, thus enabling the data control to be facilitated.

MV is consecutively calculated using each control factor and is transmitted in analog signals and digital signals through D/A card 104.

The PC-based direct control is performed based on the transmitted signals through each C/V and the inverter 15 of the pump for drawing sludge.

Each SP and PV of the internal condition of the reaction tank is mutually compared, and thereby, the efficiency of the sewage/waste water treatment plant conducting the control process is comparatively analyzed. The analysis result of this may be recorded in a file.

Consecutive control can be conducted by tuning the control factors as a method for enhancing the treatment efficiency. Thus a series of processes may be performed for building up a remote AI control system to monitor and control the field data in real time.

Figure 6:
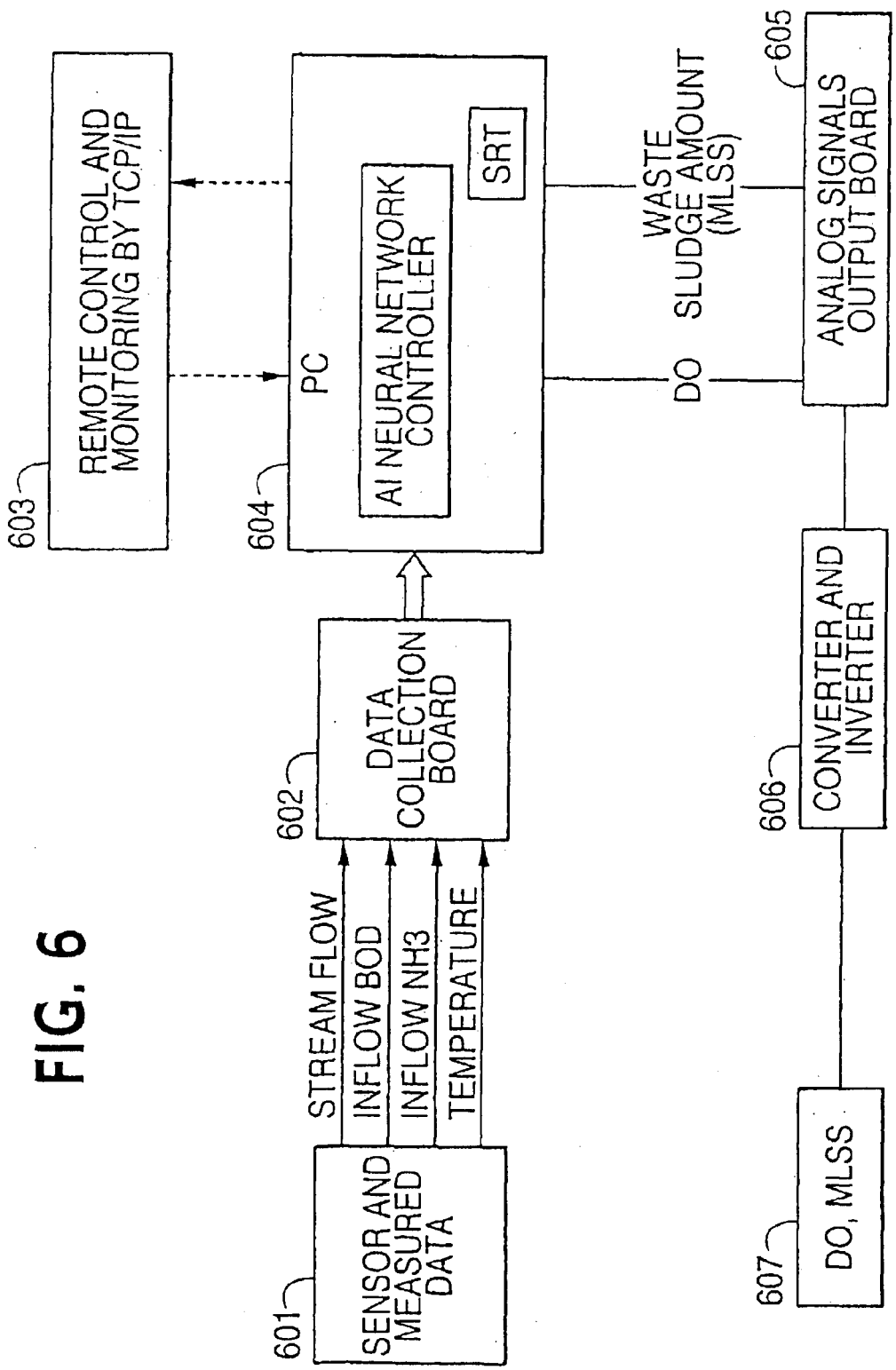
FIG. 6 is a block diagram illustrating an example of the controlling function of the system used in an embodiment of the present invention.

FIG. 6 is a block diagram showing one embodiment of an execution of the controlling function of the system used in the present invention.

As illustrated in FIG. 6, data 601, such as stream flow, inflow BOD, inflow NH3 and temperature, is collected in the data collection board 602. The collected data is transmitted to a computer 604, such as a PC with an AI neural network controller equipped therewith. The computer 604 enables remote control and monitoring work to be conducted bi-directionally and real time via a TCP/IP connection 603. DO and SRT are outputted through the AI neural network control through the analog output signal board 605. This analog signal may be converted through the converter and the inverter 606, which controls DO and MLSS 607.

An example of an embodiment of the foregoing invention follows as reviewed through input/output data.

The following represents an example of operating the experimental facilities for the treated water of the first sedimentation basin of the Environment Affairs Office with a daily treatment capacity of 50 tons. These facilities are equipped with the AI control system for treating the sewage/waste water using the neural network and the back-propagation algorithm according to the present invention.

FIGS. 9–12 show inputs indicating the condition of the inflow water and the internal condition of the reaction tank in this example.

Figure 9:
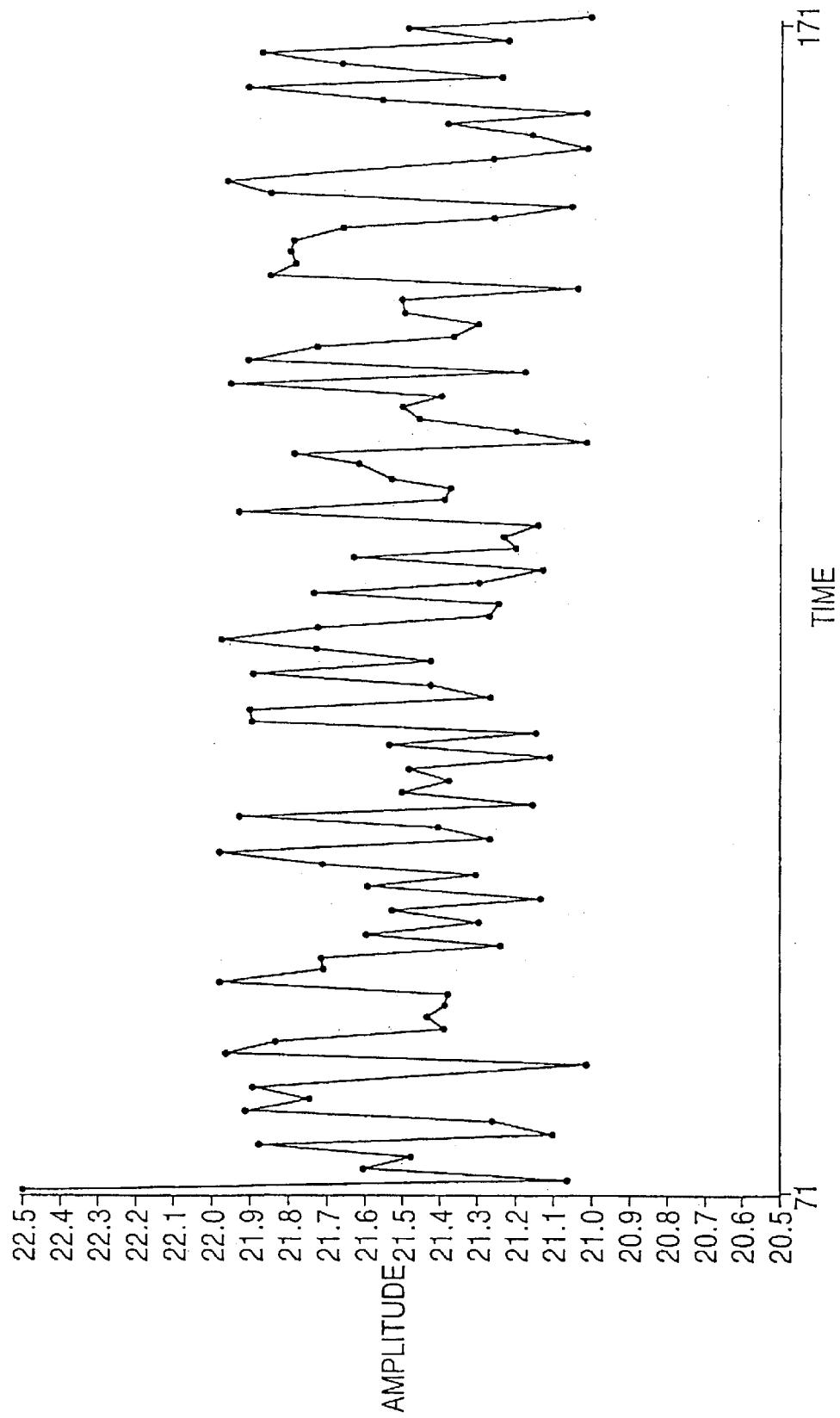
FIG. 9 is a graph of inflow temperature signals inputted to the system of an embodiment of the present invention.

FIG. 9 is a graph of inflow temperature signals inputted to the system according to the present invention. The x-axis represents time. The inflow temperature is fluidly inputted in the range of 21.0•to 21.5•.

Figure 10:
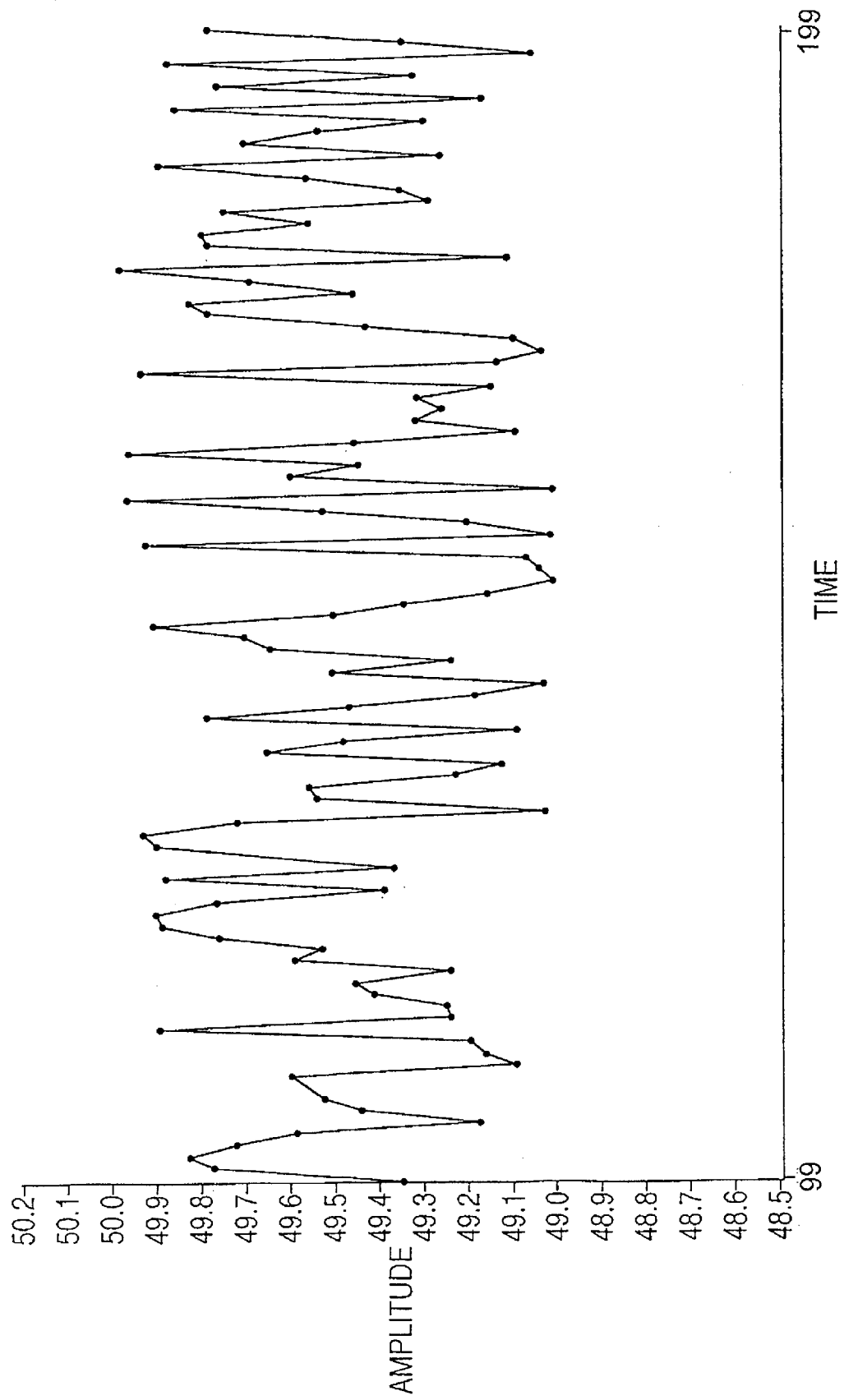
FIG. 10 is a graph of incoming stream flow signals inputted to the system of an embodiment of the present invention.
Figure 11:
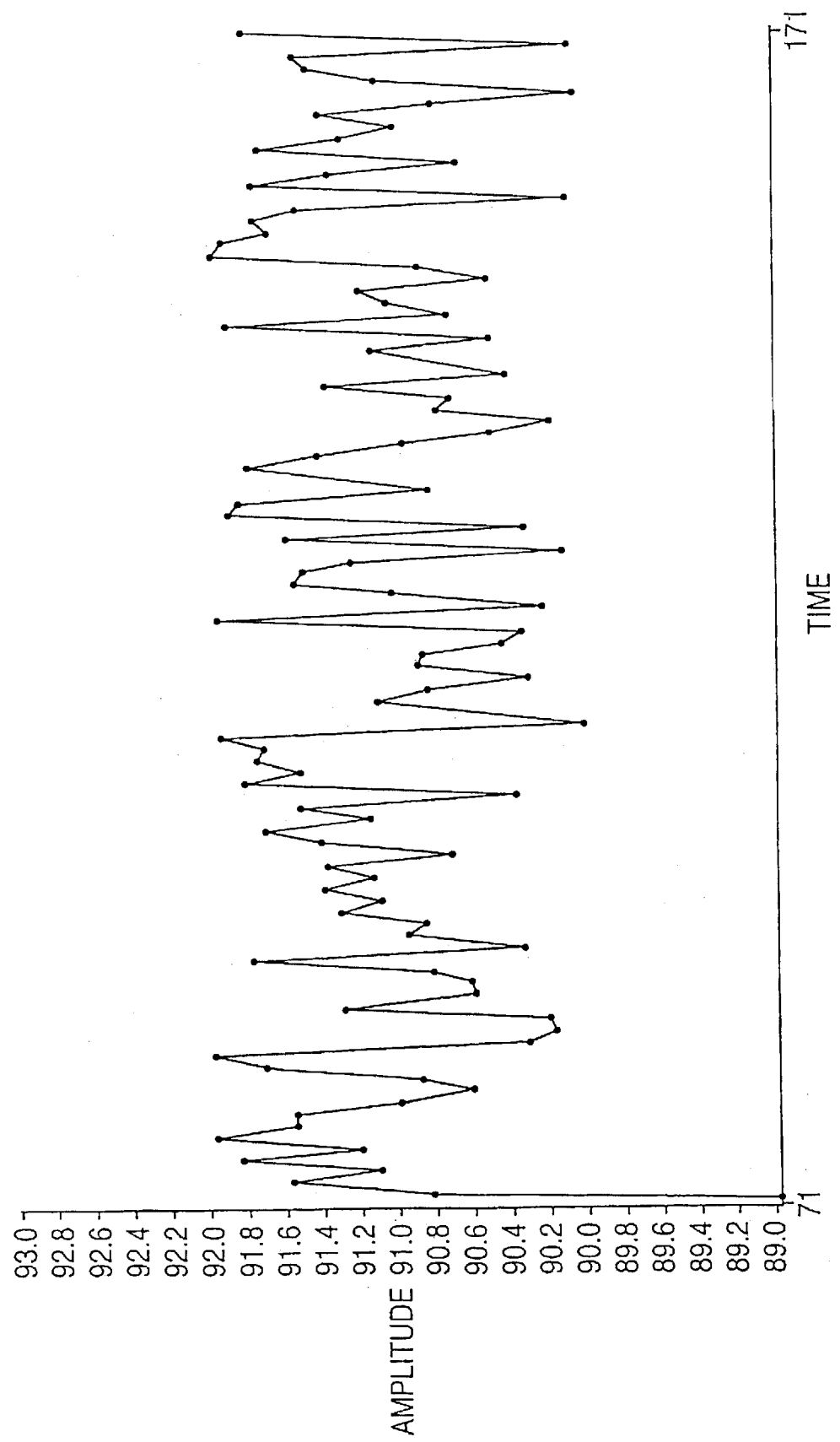
FIG. 11 is a graph of inflow BOD signals inputted to the system of an embodiment of the present invention.
Figure 12:
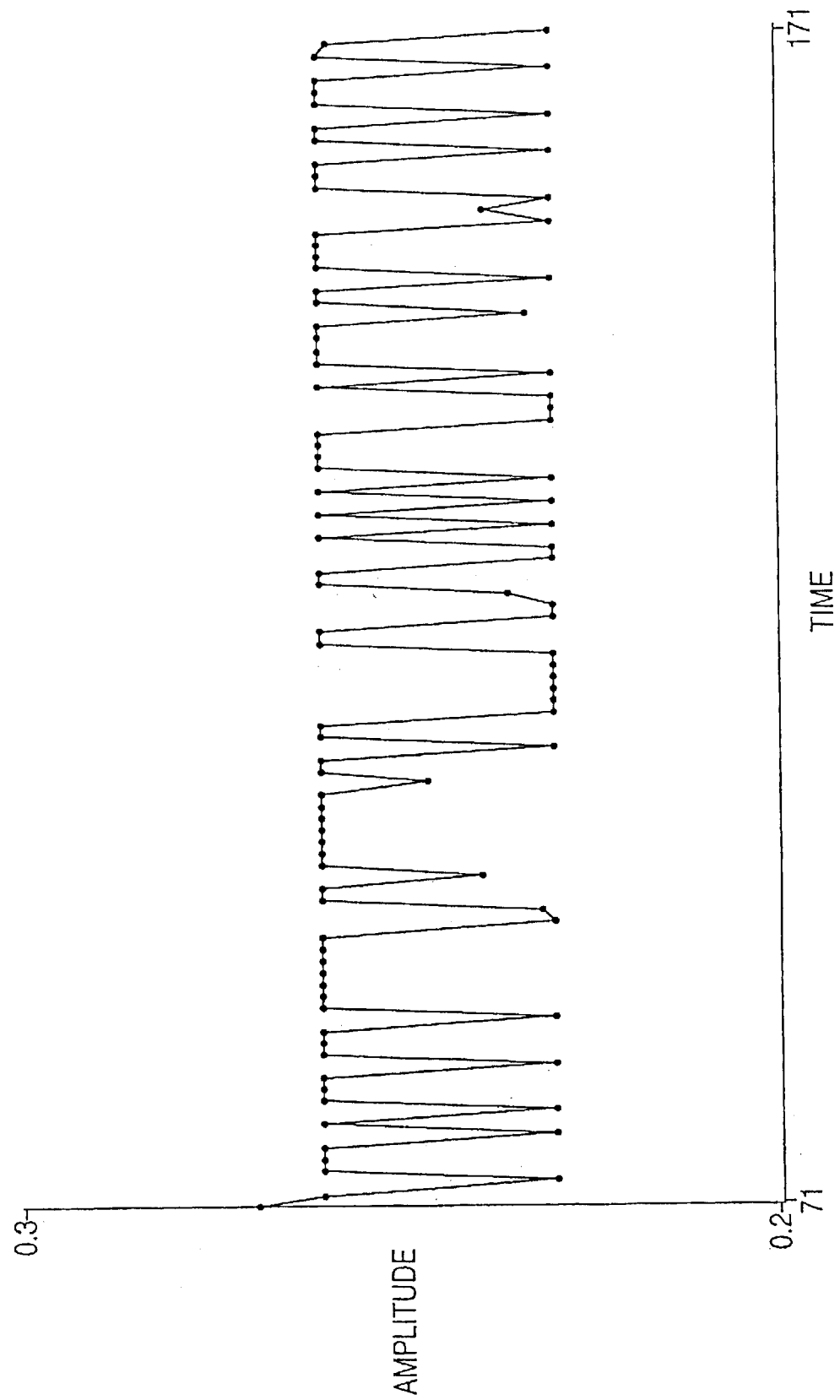
FIG. 12 is a graph of volume load signals inputted to the system of an embodiment of the present invention.

FIG. 10 is a graph of incoming stream flow signals inputted to the system. The incoming stream flow is in the range of about 49.0 to 50.0▫/day over time. FIG. 11 is a graph of inflow BOD signals inputted to the system. The inflow BOD is in the range of about 90.0 to 92.2•▫ over time. FIG. 12 is a graph of volume load signals inputted to the system. The volume load ((• of BOD)/▫.day) in the reaction tank is fluidly inputted over time.

Figure 13:
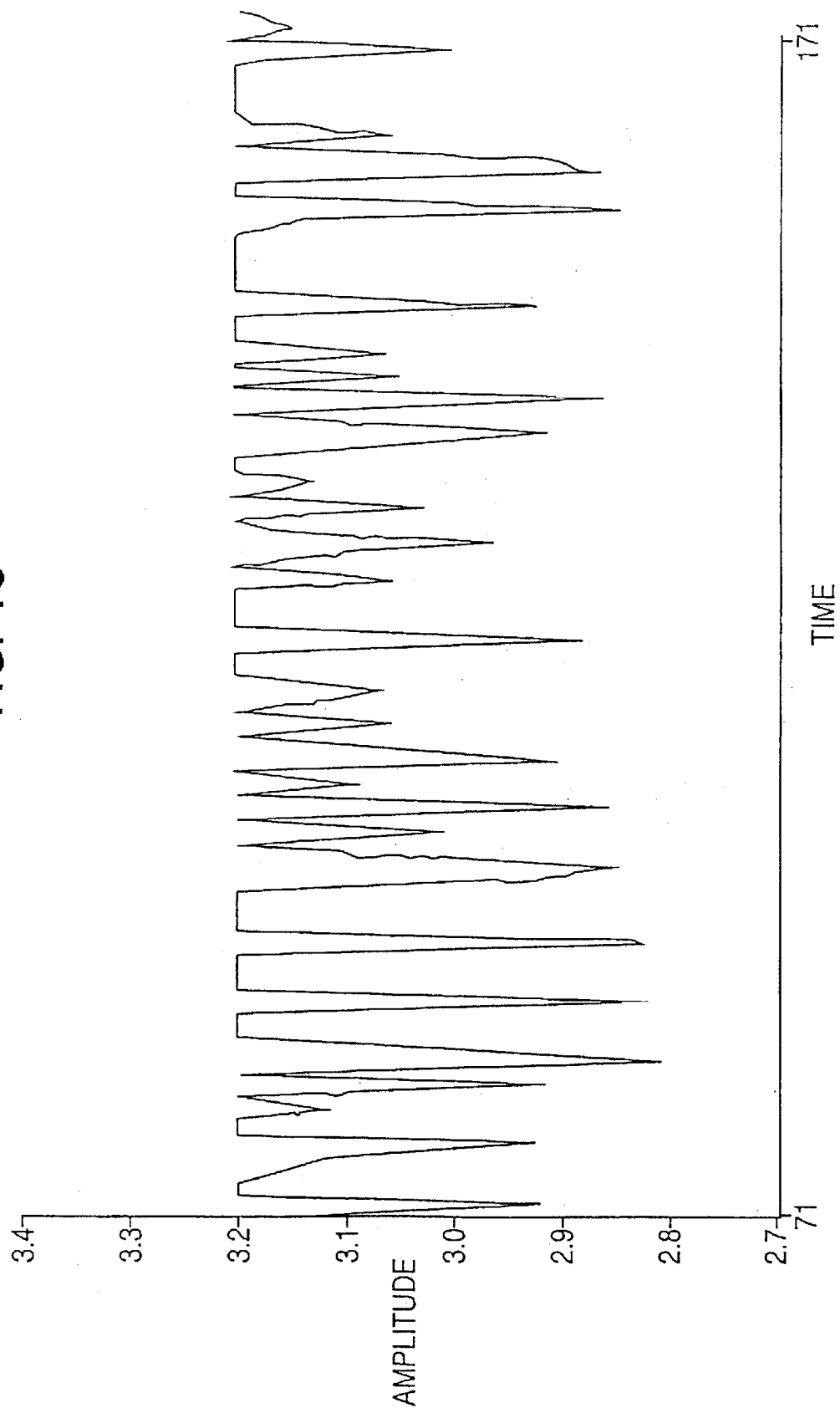
FIG. 13 is a graph of DO 1 output signals outputted from the system of an embodiment of the present invention.
Figure 14:
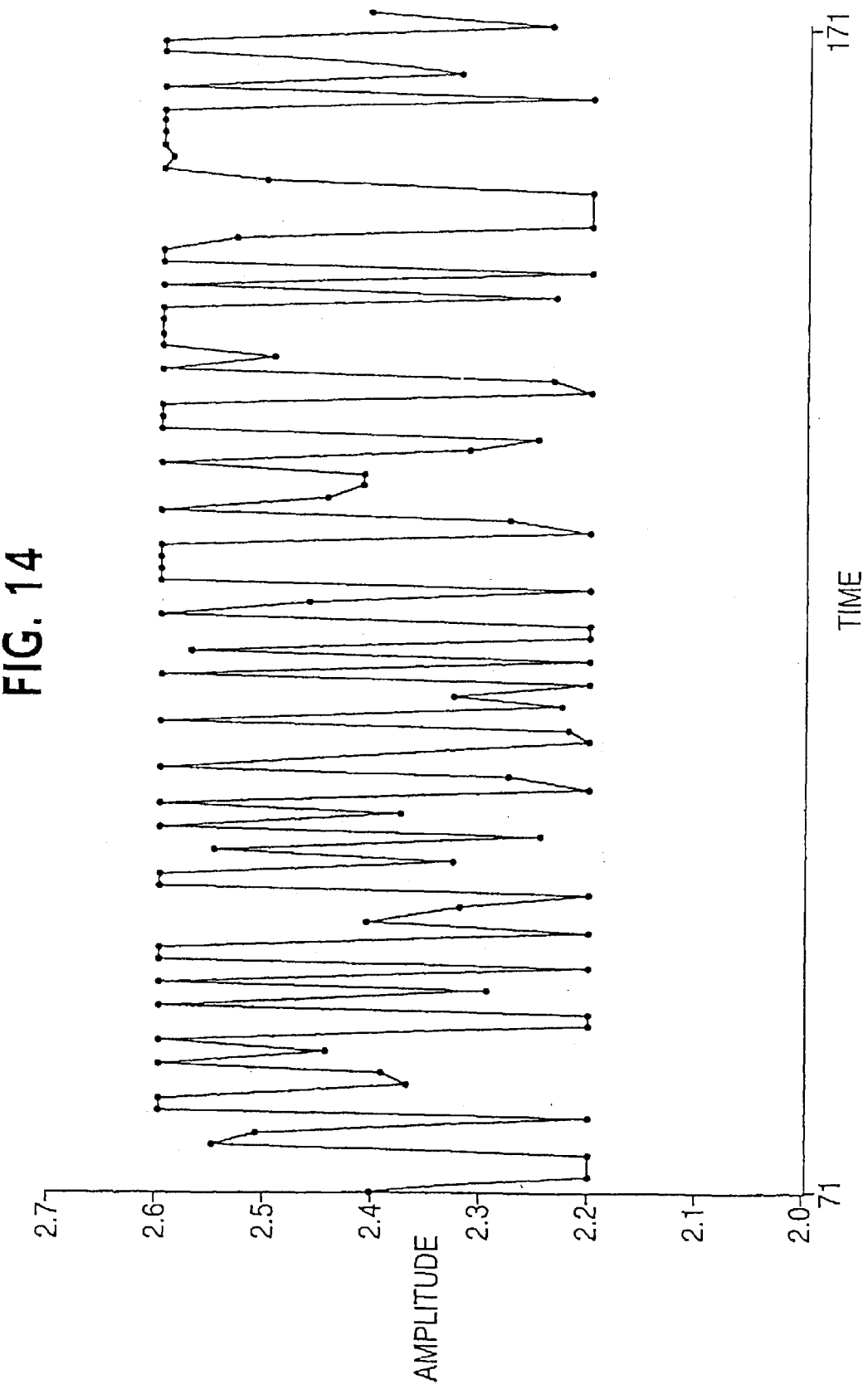
FIG. 14 is a graph of DO 2 output signals outputted from the system of an embodiment of the present invention.
Figure 15:
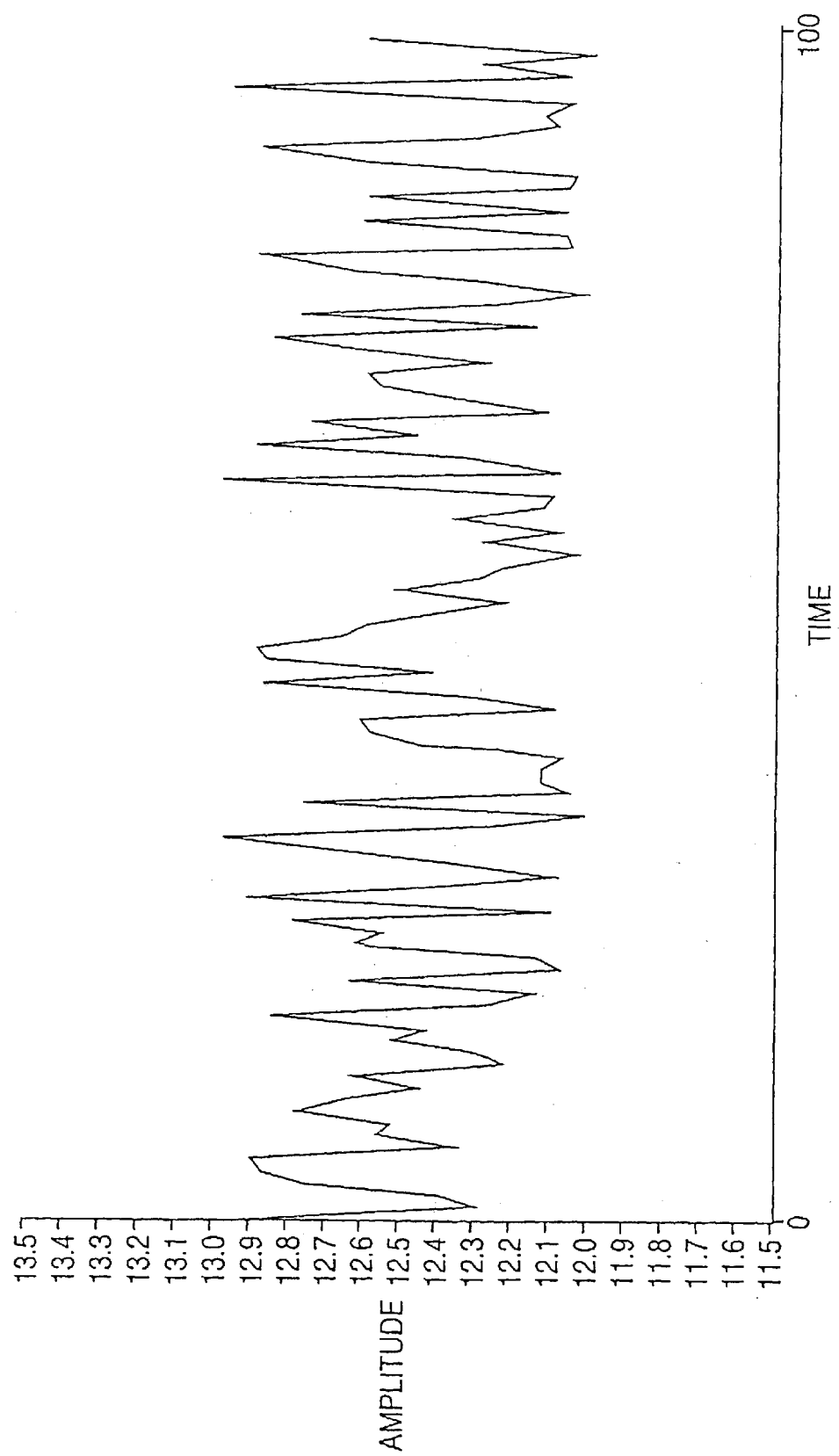
FIG. 15 is a graph of SRT output signals outputted from the system of an embodiment of the present invention.

FIG. 13 is a graph of DO 1 output signals outputted from the system. FIG. 14 is a graph of DO 2 output signals outputted from the system. FIG. 15 is a graph of SRT output signals outputted from the system according to this invention. FIG. 16 is a graph of overall output signals inputted to and/or outputted from the system according to the present invention.

It can be observed from the output graphs of this example that each DO of the first story (FIG. 13) and the second story (FIG. 14) of the exhalation tank and SRT (FIG. 15) thereof in the reaction tank are controlled such that the outputs need not be vary according to the conditions for each situation in response to each corresponding inflow condition by AI.

The AI control system according to embodiments of the present invention minimizes any incorrect operations, and allows for consistent and reliable data to be secured and precise control to be performed.

This AI control system, in contrast to the prior art, provides a stable treatment efficiency without depending upon the experience of the operator by performing the AI control through a standardized process using more standardized data. Thus, reliable data according to the demands in the advanced industrialized and information-intensive era are provided, and the labor cost and maintenance cost in the operation budget may be minimized.

Also, since the operation speed and the flexible technology of PC are reflected in the AI system through PC-based control, it is possible to provide continuous support and enhanced treatment efficiency.

While the invention has been described in detail and with reference to specific embodiments thereof, it will be apparent to one skilled in the art that various changes and modifications can be made therein without departing from the spirit and scope of the invention. Thus, the breadth and scope of the present invention should not be limited by any of the above-described exemplary embodiments, but should be defined only in accordance with the following claims and their equivalents.

What is claimed:

1. A method for controlling treatment of sewage/waste water comprising:

measuring attributes of inflow water flowing into a sewage/waste water treatment plant, attributes of an internal condition of a reaction tank having a first story and a second story, and fluid present values (PVs) of efficiency attributes of outflow water;

collecting data of the measured fluid PVs and operation-processing said data to convert said data into physical quantity data;

obtaining each optimum set point (SP) of each dissolved oxygen (DO) and solids retention time (SRT) of the first story and the second story of an exhalation tank by comparing PVs of the measured attributes using a neural network control program with a back-propagation algorithm;

converting each obtained optimum SP into an analog and digital control output value by comparing said each obtained optimum SP with each PV of each DO and SRT of the first story and the second story of the exhalation tank; and controlling each air control valve of the first story and the second story of the exhalation tank and a pump for drawing sludge based on each obtained control output value.

2. The method according to claim 1, wherein said attributes of the inflow water include incoming stream flow, temperature and biological oxygen demand (BOD) of the inflow water;

said attributes of the internal condition of the reaction tank include volume load, SRT, DO of the first story of the exhalation tank, DO of the second story of the exhalation tank, mixed liquor suspended solids (MLSS), concentration of ammonia nitrogen ($NH_4$—N), concentration of nitrate nitrogen ($NO_3$—N) and concentration of phosphorate-phosphorous ($PO_4$—P); and said attributes of the outflow water quality include BOD of the outflow water, volume and total nitrogen (T-N) thereof.

3. The method according to claim 1, wherein said neural network control program uses a learning optimization algorithm.

4. The method according to claim 3, wherein input learning data used in the neural network control program includes an attribute of the inflow water, the internal condition of the reaction tank, efficiency of the outflow water quality, and target data, which are the DO of the first story of the exhalation tank, DO of the second story of the exhalation tank and SRT, are obtained by means of weight acquired in a learning process.

5. The method according to claim 4, wherein the system of said neural network control program comprises an input layer, a hidden layer and an output layer, wherein the number of hidden layers is determined in the range of 15 to 40, and wherein the data input from the input layer to the hidden layer, the data output from the hidden layer to the output layer and the weight are determined in the hidden layer.

6. The method according to claim 5, wherein information acquired in the learning process is accumulated and saved in the weight by using a first linear sum as an active function in the output layer and a first non-linear function as an active function in the hidden layer, and wherein said weight is used to obtained each optimum SP of SRT and DO.

7. The method according to claim 4, wherein data for the input learning of the neural network control program comprises: a temperature ranging from about 5° C. to about 38° C., a BOD ranging from about 0 to about 180 mg/l, $NH_4$ concentration ranging from about 40 to about 150 mg/l, and a volume load; and the corresponding output data comprises: DO of the first story of the exhalation tank ranging from about 2.35 to about 4.3 mg/l, DO of the second story of the exhalation tank ranging from about 1.4 to about 3.3 mg/l, and SRT ranging from about 7.55 to about 21.0 days.

8. The method according to claim 4 wherein the control system is configured:
to increase mixed liquor suspended solids (MLSS) in order to decrease a food to microbes ratio (F/M) when the concentration of the inflow of $NH_4$ is increased, and to decrease MLSS in order to increase F/M when the concentration of the inflow $NH_4$ is decreased;
to decrease MLSS to maintain F/M when BOD of the inflow water is increased and MLSS is also increased, and to decrease a drawing amount of surplus sludge, maintaining F/M, when MLSS is decreased; and
to increase the air supply when BOD of the inflow water is increased, and to decrease the air supply and at the same time increase a drawing amount of surplus sludge to decrease MLSS, when the concentration of the inflow water (BOD) is decreased.

9. The method according to claim 1 further comprising:
obtaining a set of data during measuring and operation-processing and saving and controlling said data in a file.

10. The method according to claim 9 further comprising:
communicating said data bi-directionally with a computer through a transmission control protocol/internet protocol (TCP/IP) to control the treatment real time;
comparatively analyzing the efficiency of the sewage/waste water treatment plant completing said control process using a multi-processing function; and
recording the analysis result in the file.

11. A system for controlling treatment of sewage/waste water comprising:
measuring instruments for respectively measuring attributes of inflow water flowing into a sewage/waste water treatment plant, attributes of an internal condition of a reaction tank having a first story and a second story, and fluid present values (PVs) of efficiency attributes of outflow water;
a computer for:
collecting data of the measured fluid PVs, and operation-processing the data to convert the data into physical quantity data;
obtaining each optimum set point (SP) of each dissolved oxygen (DO) and solids retention time (SRT) of the first story and the second story of an exhalation tank by comparing PVs of the measured attributes by means of an application program including a neural network control program using a back-propagation algorithm; and
converting each obtained optimum SP into an analog and digital control output value by comparing each obtained optimum SP with each PV of each DO and SRT of the first story and the second story of the exhalation tank; and
air valve controllers for controlling each air control valve of the first story and the second story of the exhalation tank and a pump for drawing sludge by using a control output value.

12. The system according to claim 11 wherein:
said attributes of the inflow water include incoming stream flow, temperature and biological oxygen demand (BOD) of the inflow water;
said attributes of the internal condition of the reaction tank include volume load, SRT, DO of the first story of the exhalation tank, DO of the second story of the exhalation tank, mixed liquor suspended solids (MLSS), concentration of ammonia nitrogen ($NH_4$—N), concentration of nitrate nitrogen ($NO_3$—N) and concentration of phosphorate-phosphorous ($PO_4$—P); and
said attributes of the outflow water quality include BOD of the outflow water, volume and total nitrogen (T-N) thereof.

13. The system according to claim 11, wherein said neural network control program uses a learning optimization algorithm.

14. The system according to claim 13, wherein input learning data used in the neural network control program includes an attribute of the inflow water, the internal condition of the reaction tank, efficiency of the outflow water quality, and target data, which are the DO of the first story of the exhalation tank, DO of the second story of the exhalation tank and SRT, are obtained by means of weight acquired in a learning process.

15. The system according to claim 14, wherein the system of said neural network control program comprises an input layer, a hidden layer and an output layer, wherein the number of hidden layers is determined in the range of 15 to 40, and wherein the data input from the input layer to the hidden layer, the data output from the hidden layer to the output layer and the weight are determined in the hidden layer.

16. The system according to claim 15, wherein information acquired in the learning process is accumulated and saved in the weight by using a first linear sum as an active function in the output layer and a first non-linear function as an active function in the hidden layer, and wherein said weight is used to obtained each optimum SP of SRT and DO.

17. The system according to claim 14, wherein data for the input learning of the neural network control program comprises: a temperature ranging from about 5° C. to about 38° C., a BOD ranging from about 0 to about 180 mg/l, $NH_4$ concentration ranging from about 40 to about 150 mg/l, and a volume load; and the corresponding output data comprises: DO of the first story of the exhalation tank ranging from about 2.35 to about 4.3 mg/l, DO of the second story of the exhalation tank ranging from about 1.4 to about 3.3 mg/l, and SRT ranging from about 7.55 to about 21.0 days.

18. The system according to claim 17, wherein the control system is configured:

to increase mixed liquor suspended solids (MLSS) in order to decrease a food to microbes ratio (F/M) when the concentration of the inflow of $NH_4$ is increased, and to decrease MLSS in order to increase F/M when the concentration of the inflow $NH_4$ is decreased;

to decrease MLSS to maintain F/M when BOD of the inflow water is increased and MLSS is also increased, and to decrease a drawing amount of surplus sludge, maintaining F/M, when MLSS is decreased; and to increase the air supply when BOD of the inflow water is increased, and to decrease the air supply and at the same time increase a drawing amount of surplus sludge to decrease MLSS, when the concentration of the inflow water (BOD) is decreased.

19. A system according to claim 11, further comprising:

means obtaining a set of data during measuring and operation-processing and saving and controlling said data in a file.

20. A system according to claim 19, wherein said computer:

communicates said data bi-directionally with a computer through a transmission control protocol/internet protocol (TCP/IP) to control the treatment real time;

comparatively analyzes the efficiency of the sewage/waste water treatment plant completing said control process using a multi-processing function; and records the analysis result in the file.

* * * * *